United States Patent [19]

Stemmons

[11] Patent Number: 5,794,795

[45] Date of Patent: Aug. 18, 1998

[54] FRAMEWORK SYSTEM FOR ELECTRICAL/ELECTRONIC CONTROLS

[76] Inventor: William L. Stemmons, 164 W. 1550 North, Sunset, Utah 84015

[21] Appl. No.: 663,721

[22] Filed: Jun. 17, 1996

[51] Int. Cl.$^6$ .................................................. A47F 5/00
[52] U.S. Cl. .................... 211/26; 211/94; 211/191
[58] Field of Search ................... 211/26, 94, 162, 211/191; D25/119, 120, 121, 122, 123, 124, 125

[56] References Cited

U.S. PATENT DOCUMENTS

| | | | |
|---|---|---|---|
| D. 194,585 | 2/1963 | Waring | D25/121 |
| D. 270,479 | 9/1983 | Braswell | D25/121 |
| D. 376,209 | 12/1996 | DiGiorgio | D25/122 |
| 3,451,183 | 6/1969 | Lespagnol et al. | D25/119 X |
| 4,553,674 | 11/1985 | Yoshikawa et al. | 211/26 |
| 5,053,584 | 10/1991 | Chojnowski | D25/119 X |
| 5,267,658 | 12/1993 | Schwenk et al. | 211/26 |
| 5,323,916 | 6/1994 | Salmon | 211/26 |
| 5,330,066 | 7/1994 | Carroll | 211/191 X |
| 5,333,950 | 8/1994 | Zachrai | 211/26 X |
| 5,372,262 | 12/1994 | Benson et al. | 211/26 |
| 5,584,406 | 12/1996 | Besserer et al. | 211/26 X |

*Primary Examiner*—Robert W. Gibson, Jr.
*Attorney, Agent, or Firm*—Thomas S. Baker, Jr.

[57] ABSTRACT

A framework system for supporting multiple electrical/electronic control devices and for use in routing wires extending to and from the control devices is comprised of multiple, spaced-apart vertical tray members having an included vertically-extending wireway zone, multiple, spaced-apart horizontal tray members having included horizontally-extending wireway zones, and fastener means rigidly joining said spaced-apart horizontal tray members to said spaced-apart vertical tray members.

6 Claims, 4 Drawing Sheets

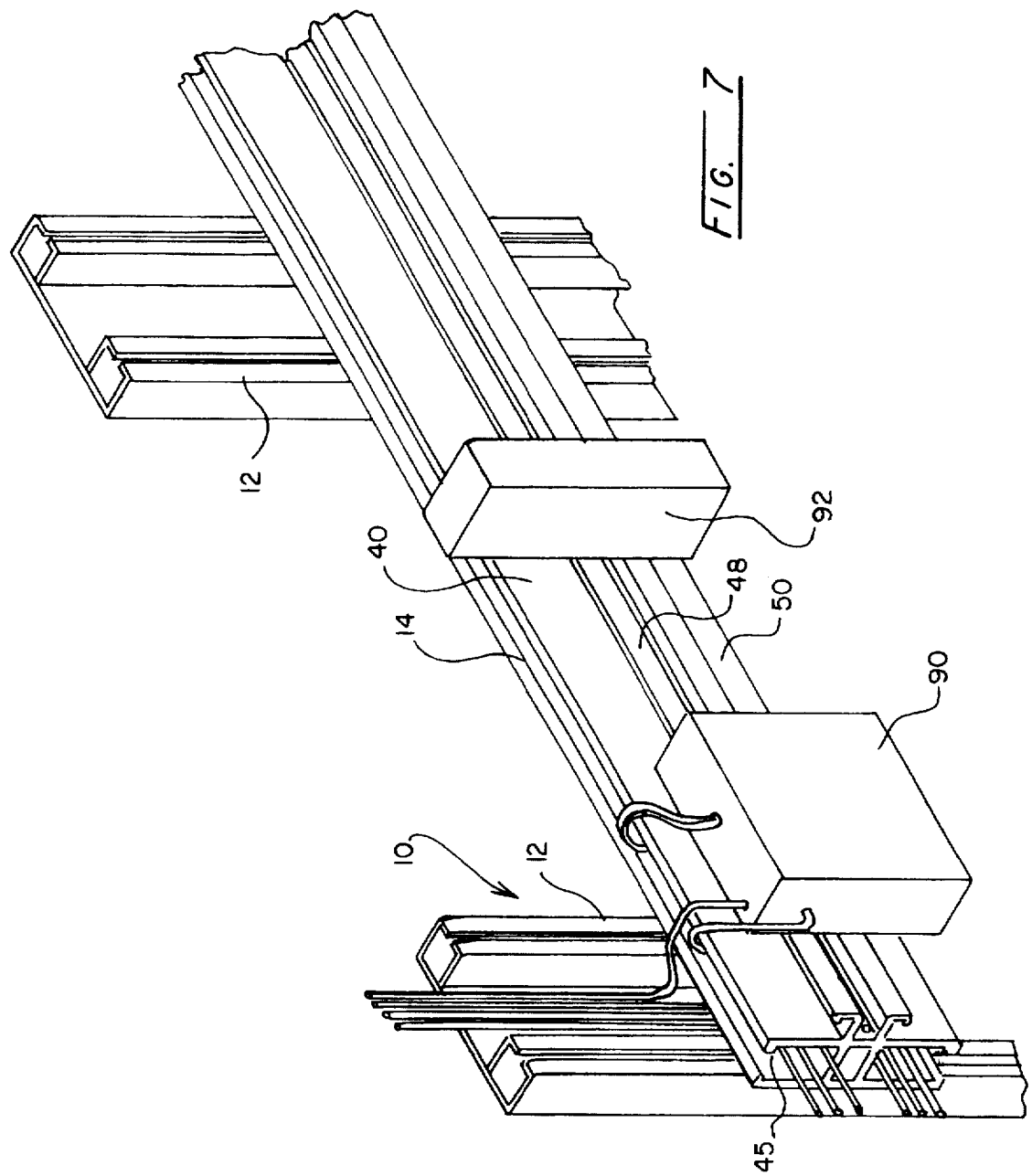

FRAMEWORK SYSTEM FOR ELECTRICAL/ELECTRONIC CONTROLS

CROSS-REFERENCES

None.

FIELD OF THE INVENTION

This invention relates generally to electrical/electronic controls, and particularly concerns a control mounting and wiring framework system for use in the installation and operation of various electrical/electronic control devices.

BACKGROUND OF THE INVENTION

Numerous different known equipment framework constructions and installation procedures have been proposed in with electrical/electronic system control arrangements. For instance, U.S. Pat. No. 2,140,376 issued to Anderson discloses a panel board construction wherein a network of wireways is joined to the reverse side of a panel board to which and through which various electrical/electronic devices are mounted and wired.

U.S. Pat. No. 2,572,617 granted to Haury, et al. discloses a continuous front electrical panel having panel front segments which may be selectively tilted down to give maintenance rear access to mounted electrical/electronic devices. No disclosure is made of incorporated wireways or of conductor classification and segregation.

U.S. Pat. No. 3,321,672 issued in the names of Kuhn, et al. discloses a system of side-by-side modular control panels with means for integrating multiple panels into a unitary system but in each instance the completed system presents a continuous front making access to the wiring of individual devices more inconvenient than necessary.

U.S. Pat. No. 4,700,846 issued to Schroder relates to the mounting of printed circuit boards on an instrument rack and while giving excellent wiring access to installed individual devices does not provide wire trays which may readily be assembled to give a capability for conductor classification and segregation.

U.S. Pat. No. 5,046,172 granted to Moreux, et al. teaches a power distribution bus system housed in a covered and insulated trough or tray and means for connecting particular devices to the bus system through cover openings and the use of translational plugging/unplugging device movement.

U.S. Pat. No. 5,326,934 granted to LeMaster, et al. teaches a system which has multiple control panel cabinets that satisfy the diverse wiring needs of an environment having numerous workstations. The system primarily transforms workstation individual cabling requirements into workstation collective cabling to reduce material, installation, and revision costs of multiple workstation connectivity.

See also the article "Wiring System Offers a Back Panel Alternative" by Udo Lutze in the July/August 1994 issue of *Electrical Design and Manufacturing* for details of a still different approach to the construction and wiring of an electrical/electronic system control arrangement.

One of the principal objects of this invention is to provide a simplified and modular form of framework for mounting and incorporating numerous of different control devices such as circuit breakers, terminal blocks, relays, and the like into a control system.

Another principal object of this invention is to provide a control system framework which readily may be constructed to permit the segregation of wiring connections to, from, and between the mounted electrical/electronic control devices into trays or channels of different voltage or frequency classes.

A still further object of the present invention is to in most cases eliminate the need for on-site drilling and tapping of connector features in order to accomplish control system installation.

Another object of this invention is to provide a control system construction with improved air circulation and heat dissipation capabilities, particularly as the control system is installed within a cabinet-type enclosure.

Still other objects and advantages of the present invention will become apparent during a consideration of the invention summary, drawings, detailed description, and claims which follow.

SUMMARY OF THE INVENTION

The present invention is an electrical/electronic control system support framework which basically is comprised of multiple, spaced-apart vertical tray members that have a preferred extrusion cross-section configuration, of multiple, spaced-apart horizontal tray members that have a preferred extrusion cross-section configuration with a control device support feature and that are supported by the vertical tray members, and of removable fasteners which join the horizontal tray members to the vertical tray members. The framework system fastener elements cooperate with modular and uniformly spaced-apart fastener receptacle features provided in the horizontal tray members and in the cooperating vertical tray members.

Various accessory devices, including wiring management comb devices, snap-on tray covers, and terminal block angled mounting brackets, may be combined with the framework to further enhance its utility.

DESCRIPTION OF THE DRAWINGS

FIG. 7 is a perspective view of a portion of the framework system of FIG. 1 illustrating the manner of mounting a representative electrical/electronic control device on a horizontal tray member and of routing the control wires for the device in the horizontal tray member and in an adjacent vertical tray member.

DETAILED DESCRIPTION

Figure 1:
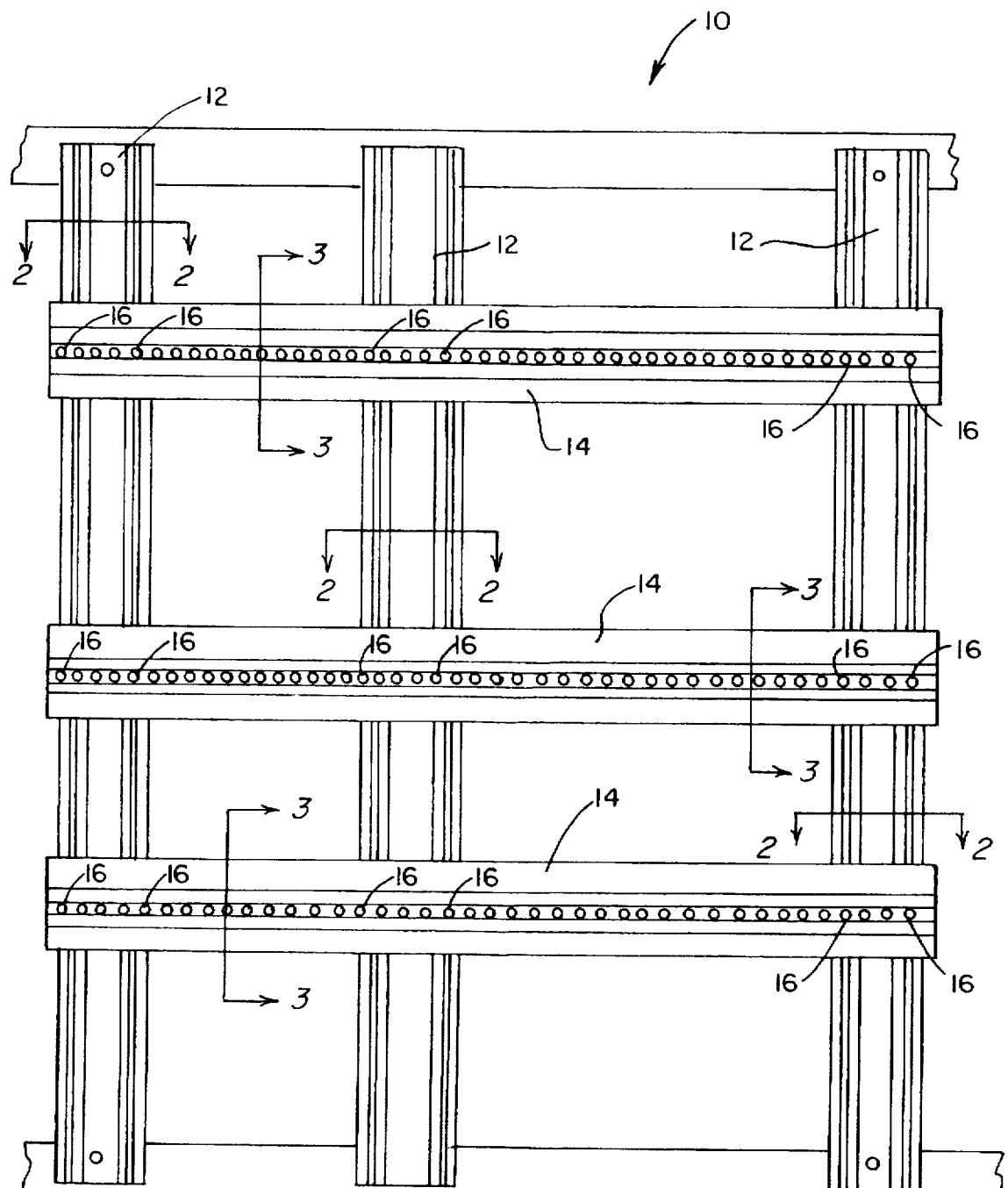
FIG. 1 is an elevation view of a preferred embodiment of the framework system of the present invention.

A preferred and representative embodiment of the framework system of this invention is referenced generally by the numeral 10 in FIG. 1 and is basically comprised of two, three or more spaced-apart vertical tray members 12 and of three or more, as required, spaced-apart horizontal tray member 14 joined to and supported by vertical tray members 12 through co-operating fastener devices 16. As elsewhere detailed in the drawings, each fastener device 16 is preferably a flat-head threaded screw and nut combination that cooperates with one of numerous uniformly spaced-apart pre-drilled fastener holes provided in each of horizontal tray members 14 and with a slotted opening and fastener recess feature provided by extrusion in each of vertical tray members 12. Vertical tray members 12 in a typical or representative system 10 installation are normally anchored to co-operating top and bottom structural elements such as the inside back wall of standard commercial electrical enclosures (boxes) which are manufactured for safe containment of electrical controls (illustrated only by phantom lines in FIG. 1) by threaded fastener devices similar to fastener element 16. It should be noted that vertical tray members 12 may have a serrated V-groove 13 which accepts a self-tapping screw or fastener device 16' as depicted in FIG. 2A in place of the threaded screw and nut combination shown in FIG. 2.

Figure 2:
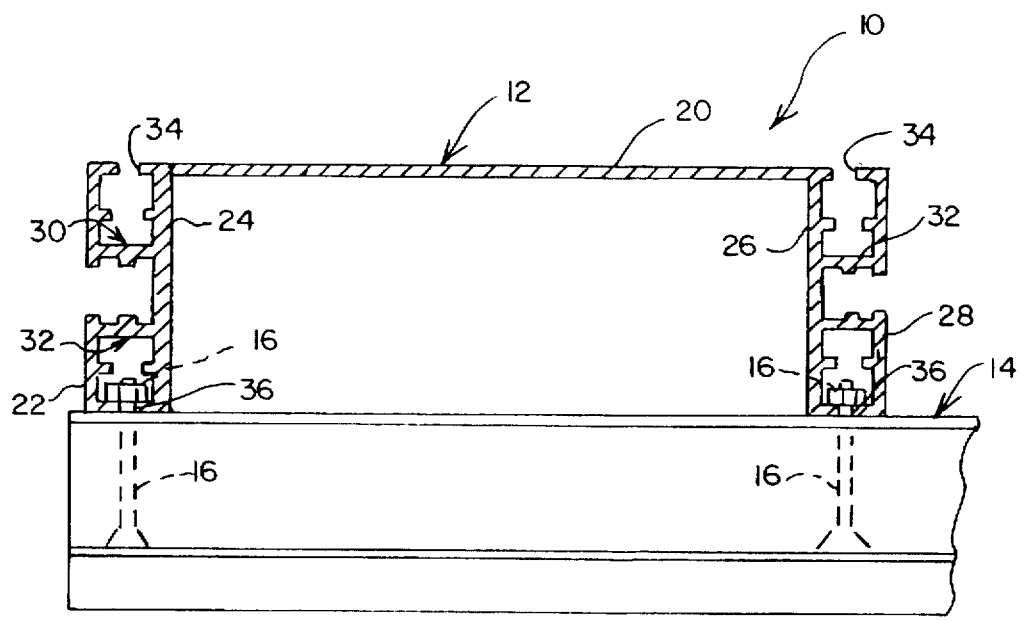
FIG. 2 is a sectional view as taken along any of lines 2—2 of FIG. 1.

FIG. 2 illustrates the cross-sectional configuration of one form of vertical tray member 12 satisfactory for the practice of this invention utilizing the threaded screw and nut combination referred to above. Tray member 12 is preferably an aluminum extrusion pre-cut to proper length prior to installation in system 10, and has a generally U-shaped cross-sectional configuration. The U-shaped configuration is derived from the illustrated arrangement of integrated rear wall section 20, side wall sections 22, 24, 26, and 28, and web sections 30 and 32. The U-shaped extrusion cross-section configuration of FIG. 2 is also provided with elongated and continuous slots or gaps 34 and 36 through which the stem of a fastener device 16 may be passed. In the FIG. 2 arrangement the wire-carrying zone of member 12 is located within wall sections 20, 24, and 26, and the fastener-receiving or enclosure zones are bounded by wall sections 22 and 24, web section 30, and a pair of slots 34 and 36 at one lateral extreme and by wall sections 26 and 28, web section 32, and a pair of slots 34 and 36 at the opposite lateral extreme. In one actual embodiment of this invention the overall dimensions of the vertical tray member extrusion are approximately 50 millimeters by 110 millimeters. It is also preferred that the center-to-center distance between the pair of slots 34 and also between the pair of slots 36 be a nominal 100 millimeters which is a multiple of a nominal 25 millimeter spacing basis between adjacent fastener openings provided in horizontal tray members 14 thus giving system 10 an increased capability for varying the placement and horizontal spacing between vertical members 12. Also it should be noted that the lateral spacings in the vertical tray member 12 extrusion depicted in FIG. 2 between wall sections 22 and 24 and between wall sections 26 and 28 are controlled so as to permit receiving the nut portion of a fastener device 16 yet preventing rotation of that nut portion during rotation of the threaded fastener stem.

Figure 2A:
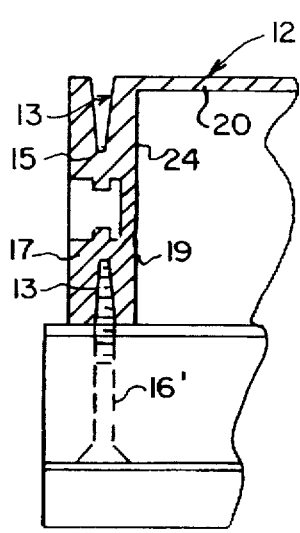
FIG. 2A is a sectional view of an alternate embodiment of the fastener device depicted in FIG. 2.

In the embodiment depicted in FIG. 2A, the wire-carrying zone of member 12 located within wall sections 20, 24, and 26. This is the same as the wire-carrying zone of the preferred embodiment of FIG. 2. However, in the alternate embodiment of vertical tray 12 illustrated in FIG. 2A the fastener receiving or enclosure zones 15 and 17 are located outboard of wall section 24 and 26 and are formed with V-shaped serrated grooves 13 formed in an extruded wall 19. The grooves 13 are adapted to receive a self tapping fastener device 16'. The serrated groove 13 and self tapping fastener 16' of this embodiment has an advantage in that a one piece fastener 16' may be utilized in place of a two piece nut and bolt fastener 16.

Figure 3:
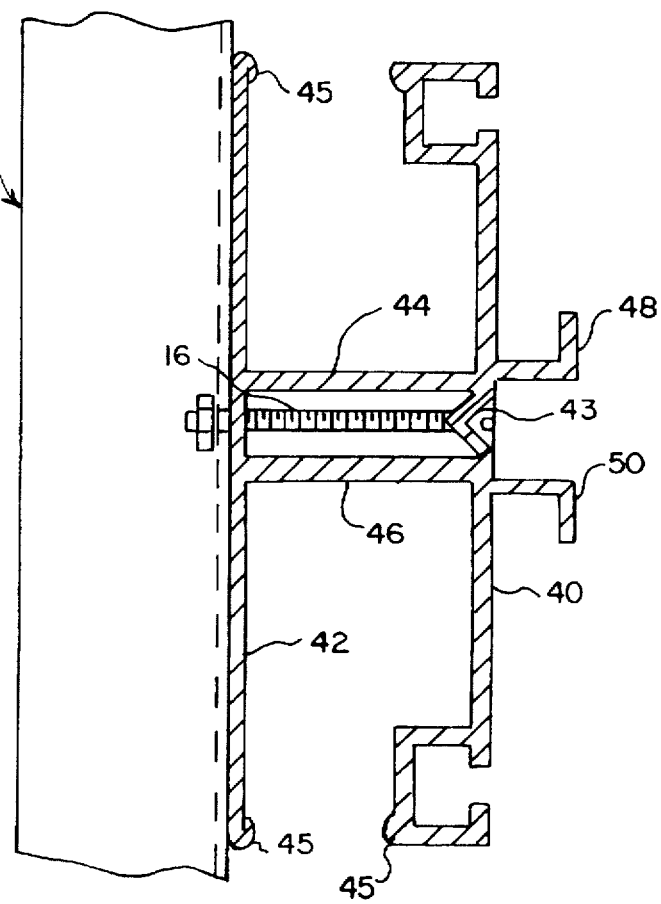
FIG. 3 is a sectional view as taken along any of lines 3—3 of FIG. 1.

As best shown in FIG. 3, the extrusion comprising horizontal tray member 14 has a basic H-shaped configuration. Horizontal tray member 14 is comprised of integrated front wall section 40, rear wall section 42, and intermediate, spaced-apart web sections 44 and 46. Also included in the cross-section configuration of FIG. 3 are integrally-formed right-angle flanges 48 and 50 which are properly located and sized to comprise a DIN (Deutsche Industrie Norm)-type mounting rail for co-operably supporting various electrical/electronic control devices. Alternatively, integral right-angle flanges arranged to comprise a NEMA (National Electrical Manufacturers Association)-type mounting rail may be used in place of the DIN-type mounting rail. As discussed in connection with FIG. 6, an adaptor device may be combined with the DIN-type mounting rail configuration to convert it to the NEMA-type mounting rail configuration.

The intermediate integral web sections 44 and 46 are essentially centrally positioned and are spaced apart a sufficient distance to provide a fastener device accommodation zone that is essentially defined as being interiorly of extrusion wall and web sections 40, 42, 44, and 46. The extrusion cross-section open zones defined by front wall section 40, rear wall section 42, and upper web section 44, and by front wall section 40, rear wall section 42, and lower web section 46 constitute the extrusion wire-carrying trays.

As previously indicated, I prefer that fastener devices 16 utilized in the construction of system 10 be flat-head machine screw and nut combinations. Accordingly, the central section of front wall section 40 of the tray member 14 extrusion is provided with a V-groove feature to accommodate the conical head of a flat-headed machine screw. Also, although not illustrated in FIG. 3 (see FIG. 1 instead), each horizontal tray member 14 extrusion is subsequently provided with multiple, oppositely-aligned and drilled openings (holes) in wall sections 40 and 42 to accommodate the ready installation of fastener devices 16 into system 10. As previously indicated, such oppositely aligned fastener device openings are preferably separated by 25 millimeter spacings.

Figure 4:
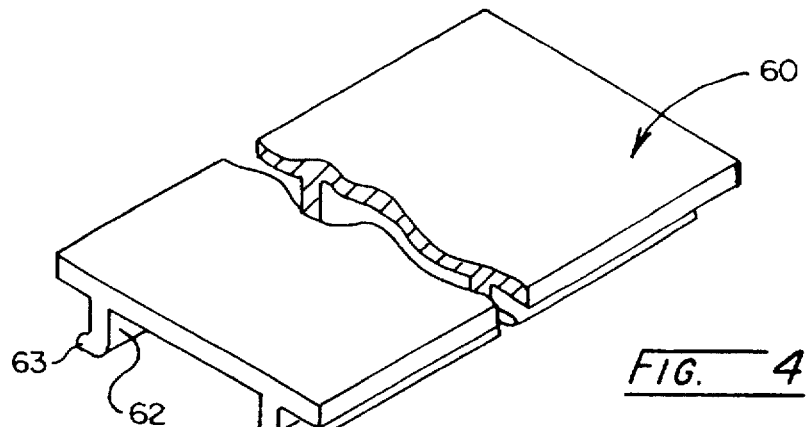
FIG. 4 is a perspective view of a portion of a typical snap-on cover accessory that may be advantageously utilized with the framework system of FIG. 1.

FIG. 4 illustrates an extruded (and preferably yieldable plastic) snap-on cover member 60 which may be advantageously utilized in instances wherein it is desired to cover major portions of those system 10 tray member wireways which carry various electrical/electronic control device wires to and from different points of connection or utilization. The protruding underside integral flanges 62 are spaced apart so that their enlarged terminations 63 have a slight interference fit with the enlarged wall terminations 45 of wall sections 40 and 42.

Figure 5:
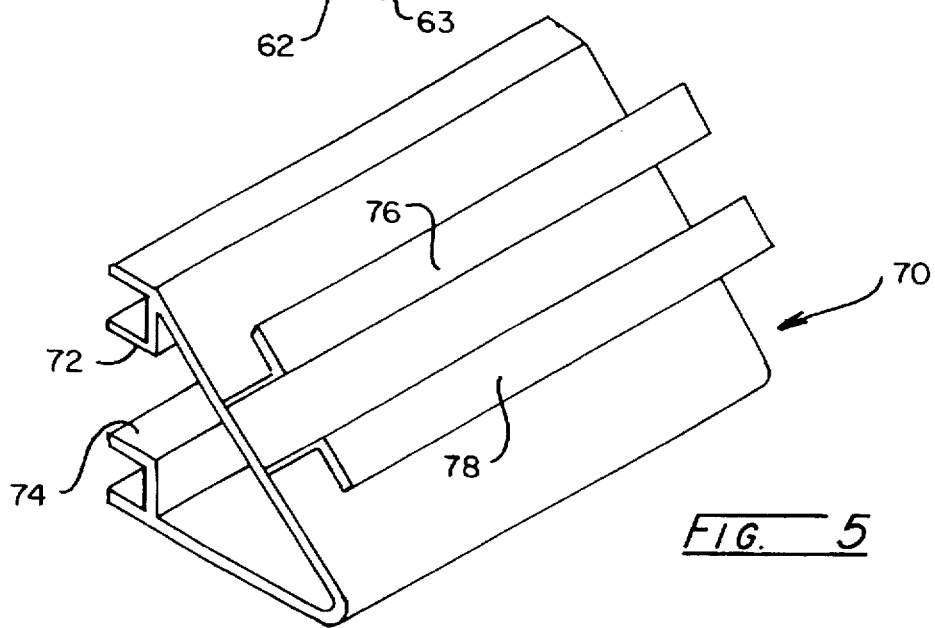
FIG. 5 is a perspective view of an angled adaptor accessory that may be advantageously utilized with the framework system of FIG. 1 for the subsequent installation of electrical devices having DIN-type rail mounts.

In FIG. 5 I illustrate an adaptor accessory 70 for system 10 that may be utilized in instances wherein it is desired to have the DIN-type mounting rail element comprised of combined flanges 48 and 50 mounted at an angle such as 45° relative to true vertical. Adaptor 70 also is preferably fabricated of metal (e.g., aluminum) and may be formed by extrusion. The adaptor flanges designated 72 and 74 are sized and spaced apart so as to be slidably engaged with integral flanges 48 and 50 of horizontal tray member 14. Integrally formed right-angle flanges 76 and 78 essentially are sized and spaced-apart identically to mounting rail flanges 48 and 50.

Figure 6:
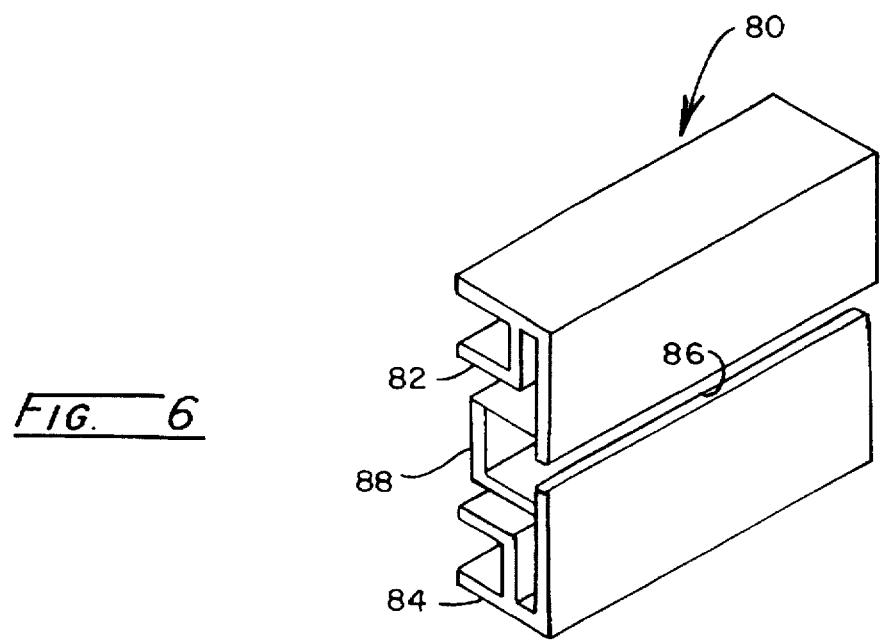
FIG. 6 is a perspective view of a straight adaptor accessory that may advantageously be utilized with the framework system of FIG. 1 for the subsequent installation of electrical devices having NEMA-type rail mounts.

In FIG. 6 I illustrate an adaptor accessory 80 for system 10 that may be utilized in instances wherein it is desired to have the DIN-type mounting rail comprised of flanges 48 and 50 replaced by a NEMA-type mounting rail to take a threaded fastener connection. In adaptor 80, which also is preferably an aluminum extrusion, integral right-angle flanges 82 and 84 are also sized and spaced apart so as to be slidably engaged with integral flanges 48 and 50 of tray member 14. The illustrated longitudinal slot 86 of adaptor 80 functions to receive the stem of a threaded fastener with the fastener nut portion being rotationally restrained within the enclosed zone defined by the integral U-shaped enclosure wall section designated 88.

FIG. 7 is provided in the drawings to illustrate the manner in which various wires may be routed to and from schematic electrical/electronic control devices 90 and 92 which are shown mounted on horizontal tray member 14 having a DIN-type device mounting rail. Depending upon the requirements of a particular installation of framework 10, wires running to or from the system control devices may be looped either upwardly or downwardly and into the upper or lower wireway of tray member 14. The so-routed wires may then be run laterally within the wireway interior zones to an appropriate one of vertical tray members 12 where it is subsequently routed in the vertical tray member wireway upwardly or downwardly to another horizontal tray member or to a source connection. Depending upon the number of different voltage, frequency, or interference resistance classifications that may pertain to the overall control system, individual vertical tray members and horizontal tray member wireway zones may be dedicated or segregated to include wires only in a particular wireway classification.

One of the major advantages associated with the above-described modular control framework system is the high degree of structural rigidity that is developed using the illustrated construction of vertical tray members, horizontal tray members supported by the vertical tray members, and mechanical fasteners.

Other component materials, component shapes, and component sizes may be utilized in the practice of the present invention without departing from the scope or intent of the claims which follow.

I claim as my invention:

1. A framework system for supporting multiple electrical/electronic control devices, and comprising:
   multiple, spaced-apart vertical tray members which each have a vertically extending wireway zone;
   multiple, spaced-apart horizontal tray members which each have at least two horizontally-extending wireway zones; and
   multiple fastener devices rigidly securing said horizontal tray members to said vertical tray members, said fastener devices passing through horizontal fastener enclosure zones located in said horizontal tray members.

2. The invention defined by claim 1 wherein said vertical tray members each have a generally U-shaped cross-section configuration defined by a rear wall and a pair of side walls that includes a vertical wireway zone positioned intermediate a pair of vertical fastener enclosure zones.

3. The invention defined by claim 2 wherein said vertical fastener enclosure zones are partially defined by said side walls.

4. The invention defined by claim 3 wherein said vertical enclosure zones have V-shaped serrated grooves.

5. The invention defined by claim 3 wherein said vertical enclosure zones are adapted to receive the nut portion of a nut and bolt assembly.

6. The invention defined by claim 1 wherein said horizontal tray members each have a generally H-shaped cross section configuration that includes a pair of horizontal wireway zones separated by a horizontal fastener enclosure zone.

* * * * *